United States Patent [19]

Toffle

[11] Patent Number: 4,931,338
[45] Date of Patent: Jun. 5, 1990

[54] TEST DISK HAVING FLUOROCARBON RESIN ASPERITIES FOR MAGNETIC DISK DRIVE COMPONENT TESTING

[75] Inventor: Mark A. Toffle, St. Louis Park, Minn.

[73] Assignee: Magnetic Peripherals Inc., Minnetonka, Minn.

[21] Appl. No.: 244,202

[22] Filed: Sep. 14, 1988

[51] Int. Cl.$^5$ ............................ B32B 3/02; G11B 5/82
[52] U.S. Cl. .................................... 428/65; 360/135; 427/269; 428/421
[58] Field of Search .................... 428/64, 65, 421, 121; 427/261, 269; 360/135

[56] References Cited

U.S. PATENT DOCUMENTS

| | | | |
|---|---|---|---|
| 3,306,800 | 2/1967 | Plueddemann | 525/100 X |
| 3,418,153 | 12/1968 | Levene | 428/421 X |
| 3,787,281 | 1/1974 | Effenberger | 428/393 |
| 3,898,361 | 8/1975 | Bjerk et al. | 428/421 X |
| 4,042,085 | 8/1977 | Bjerk et al. | 428/421 X |
| 4,045,402 | 8/1977 | Bjerk et al. | 428/421 X |
| 4,051,100 | 9/1977 | Bjerk et al. | 428/421 X |
| 4,513,333 | 4/1985 | Young et al. | 360/77 |
| 4,644,641 | 2/1987 | Verdone | 29/603 |
| 4,828,895 | 5/1989 | Bickert et al. | 428/65 |

FOREIGN PATENT DOCUMENTS 556760 4/1958 Canada ............................... 428/421

OTHER PUBLICATIONS

IBM Tech. Discl. Bulletin, vol. 25, No. 3A, Aug. 1982, R. W. Broome, "Calibrated Asperity Disk".

IEEE Transactions on Magnetics, vol. Mag-18, No. 6, Nov. 1982, Mackintosh et al, "A Standard Disk for Calibrating Head-Disk Interference Measuring Equipment".

IBM Tech. Discl. Bulletin, vol. 21, No. 12, May 1979, R. C. Blair et al., "Asperity Disk".

*Primary Examiner*—Henry F. Epstein
*Attorney, Agent, or Firm*—Edward P. Heller, III

[57] ABSTRACT

A disk for testing the sliders and their supports used in rigid magnetic disk drives has at least one asperity formed of a fluorocarbon resin. Such a test disk when mounted on a spindle and rotated allows testing the mechanical performance of the sliders carrying the data transducing heads in a disk memory by flying the sliders to be tested on the test disk and observing their performance when flying over the resin asperity. A method for producing the asperity involves depositing a drop of a fluorocarbon resin solution on the area of the disk wherever an asperity is desired, drying the solution to leave a small mound of the resin where the drop was deposited, and the no curing the resin by baking. The height of an asperity can be varied by machining or by varying the concentration of the fluorocarbon resin in the solution.

8 Claims, 2 Drawing Sheets

TEST DISK HAVING FLUOROCARBON RESIN ASPERITIES FOR MAGNETIC DISK DRIVE COMPONENT TESTING

BACKGROUND OF THE INVENTION/INFORMATION DISCLOSURE STATEMENT

The magnetic disk drive is for several reasons the most common of the mass data storage devices used in computing systems today. Those drives having rigid disks as the medium have relatively large capacity, a price per bit stored that is quite low and rapid availability of the data stored. The rapid availability of the data is due mainly to the high rotational speed of the rigid disks, which in turn is dependent on the use of aerodynamically suspended flyers carrying the data transducers a few microinches above the disk surface. The surfaces of the flyers facing the disks are designed to create aerodynamic lift resulting from the disk's rotation which, when the flyer is properly suspended from an arm, causes the trailing edge of the flyer to accurately follow the surface of the disk just a few microinches from it. The arm may be moved to shift the flyer across a portion of the radius of the disk, thereby allowing the transducer to read data previously written on the disk in a magnetic medium layer and to write data in the medium layer.

To reliably fly the flyer for the years of failure-free performance now expected for such disk drives, it is important that the disk be as flat and free of imperfections as is possible. However, since it is not possible to have disks that have totally perfect surfaces, or for that matter spindle bearings with no axial runout or vibration, the flyers themselves are suspended by a gimbal mounting from a flexible arm. The arm and gimbal cooperate to allow the flyers to adjust themselves to the changes in the attitude of the disk surface. Thus, vertical (axial) runout of the disk surface or asperities in the disk surface will result in the flyer adjusting itself to the changing surface attitude and altitude rather than causing the flyer and disk surface to contact and possibly be damaged, i.e. "crash". Vertical disk runout refers to relatively gradual changes in the position of the disk normal to its surface. The term "asperity" in this context means a relatively localized projection on the surface of a disk on which a flyer suitable for carrying a transducer may be flown, which projection is of a height and size as to test the tolerance of the flyer and its subsystem to such defects when the flyer passes over it during normal flying operation. For convenience' sake, the flyer or slider, the gimbal which attaches the slider to the arm, and the flexible arm itself, will on occasion be referred to as the SGA (slider-gimbal-arm) assembly hereafter.

The flexible arm and the gimbal suspension form a delicate subsystem of the drive for supporting the flyer. During manufacture of these parts one must be certain that the characteristics of each suspension and arm will permit them to properly support the flyer over the entire life of the drive. Consequently, it is important that samples of the arm/suspension subsystem are tested to make sure that their dynamic response to the various disk surface defects and conditions is satisfactory, thus insuring that the manufacturing processes for the subsystem have not degraded. In one type of such testing the flyers are actually flown on test disks which have surface defects artificially placed on them.

In the past the desired asperities on test disks have been created by either distorting the disk surface in a predetermined manner or by depositing a material to create a number of individual asperities on the disk surface. The former procedure is exemplified by IBM Technical Disclosure Bulletin, Vol. 25, No. 3A, August 1982, p. 1087, "Calibrated Asperity Disk" (Broome), where the asperities are created by creating convex bumps with carefully controlled height in the surface of the disk by drilling through the disk from the bottom side. The latter procedure is described in IBM Technical Disclosure Bulletin, Vol. 21, No. 12, May 1979, "Asperity Disk" (Blair, et al.), and in IEEE Transactions on Magnetics, Vol. MAG-18, No. 6, November 1982, "A Standard Disk for Calibrating Head-Disk Interference Measuring Equipment" (Mackintosh et al.). The latter references suggest the use of any of a number of materials to constitute the protrusions. Among the materials mentioned are chromium, various metal carbides, and tungsten, selected for resistance to wear. The harder of these materials can damage the flyer under test. The softer ones have been determined to not have sufficient wear resistance. It is important that such test disks have asperities that are durable and whose characteristics can be reproduced with accuracy, so that testing over a period of time has a standardized basis which will indicate quickly when the arm/suspension subsystem under test is faulty. If the test disk in use is or can possibly be the source of the change in test results, no worthwhile data will be generated defining the characteristics of the arm/suspension subsystem and flyer under test.

It frequently is desirable to place asperities of controlled height and footprint size and shape on a transparent glass disk, so that performance of the flyer as it passes over them can be directly observed. For example, if the area is illuminated with monochromatic light, the Moire interference fringes will give a good indication of the changes in the flying height. Unfortunately, the materials usually selected to constitute the asperities adhere very poorly to glass. Accordingly, it has been difficult in the past to directly observe the dynamic response of disk memory flyers when encountering during flying, asperities whose height and footprint dimensions are accurately controlled.

BRIEF DESCRIPTION OF THE INVENTION

Durable asperities on a transparent glass disk substrate may comprise projections formed of a fluorocarbon resin with modifiers. Projections formed from this material may have a preselected footprint shape and size and a preselected projection height above the surrounding surface. Such materials are sold under the trade name Teflon-S, reg. trademark of DuPont Co. In particular, any one of the 954-200 series as described in the DuPont brochure No. E-33980 Rev. 2 is suitable when applied properly. Adhesion to glass is satisfactory when the glass surface is properly prepared, and the relative softness of the fluorocarbon material reduces damage to the flyer if strikes between the flyer and the projections occur during use.

It is possible to accurately control the height which the projection rises above the surrounding disk surface to within a microinch or so within a range of 4 to 12 microinches by suitable machining of the projections with a burnish slider after they have been formed. Illuminating the burnish slider with monochromatic light while it is flying on a disk allows its flying height relative to the surface area surrounding each asperity to be determined through use of Moire fringe techniques, and the height of the asperity relative to the surrounding surface to be accurately controlled and measured.

The projections may be formed in one process by first placing a preselected quantity of a liquid in which is dissolved a fluorocarbon resin with modifiers on the preselected area of the disk. Typically there will be more than one area that will receive a quantity of the liquid. The amount of liquid placed on an area of the disk depends on the height of the projection desired and the area of its footprint. Then the liquid solution of fluorocarbon resin with modifiers is allowed to dry, after which the disk with the remaining fluorocarbon resin-with-modifiers material is baked in an oven. The temperature and length of baking time is as is specified for the material involved, typically a few tens of minutes at around 300° F.

The preferred way to control the footprint of the projection is to overlay at least a part of the test disk surface with a flat plate having at least one hole in which the liquid solution is placed. The amount of material can be controlled by selecting the size of drop which is deposited. After drying the entire assembly, disk and flat plate, then the test disk and the fluorocarbon material is baked as specified, the flat plate being removed either before or after the baking.

To finally set the height of the projection, a burnish slider may be flown in the conventional fashion on the rotating test disk over the areas carrying the projections. The relatively soft fluorocarbon material machined from the tops of the projections during this step is relatively unlikely to cause damage to the disk. By selection of the burnish slider and suspension characteristics, the height of the asperities can be accurately controlled.

Accordingly, one purpose of this invention is to provide a transparent test disk having asperities, which may be substituted for the standard recording disk used in a magnetic disk drive, and on which may be flown data transducers to observe with Moire fringe techniques their flying height performance when passing over the asperities.

Another purpose is to provide a test disk which retains its surface characteristics with very little change over long operation so as to allow a number of different transducers to be tested under identical conditions and their flying characteristics accurately compared.

Another purpose is to provide asperities on a test disk which will not damage the transducer under test when struck by the transducer.

Yet another purpose is to provide asperities which will adhere tightly to the surface of a transparent glass disk.

A further purpose is to provide a test disk with asperities of accurately calibrated height, and asperities of different heights on the same disk.

DESCRIPTION OF THE PREFERRED EMBODIMENTS

Figure 1:
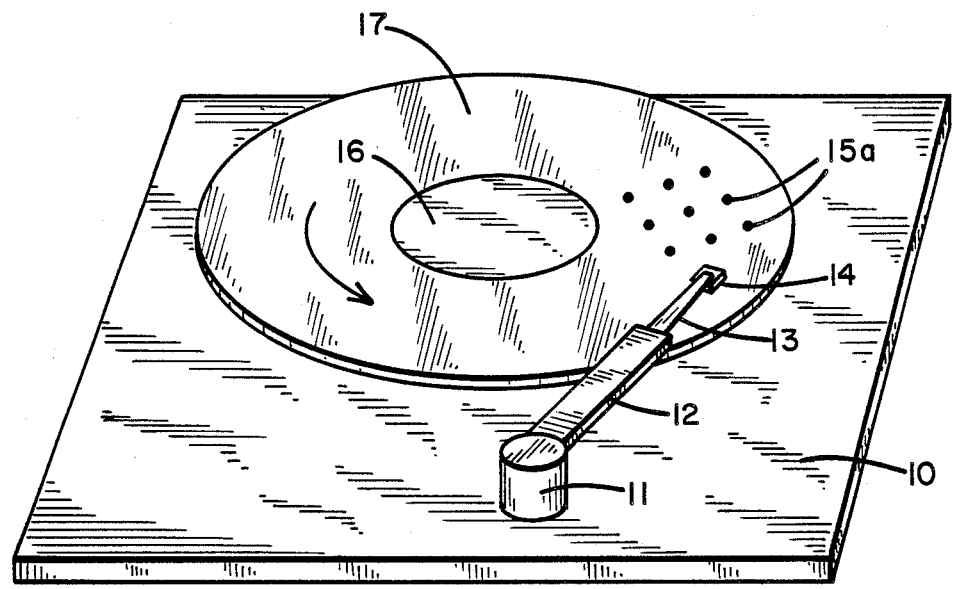
FIG. 1 shows a test system with a slider to be tested positioned on the test disk surface.

Turning first to FIG. 1, therein is shown a simple sketch of a test system carried on a base 10. Disk 17 is supported on a spindle 16 mounted for rotation on deck 10. Disk 17 has on its top surface individual asperities 15a positioned at convenient preselected radii. The asperities 15 comprise fluorocarbon material with modifiers, and may be any convenient size. I have found that circular asperities of 0.125 in. (3.2 mm.) diameter is one size that seems to work well for the intended purpose and be relatively easy to fabricate as well. The preferred height above the surrounding disk 17 surface for each asperity 15a is from 4 to 12 $\mu$inches (0.1 to 0.3 $\mu$). Disk 17 is typically made of glass so that events occurring on the top surface in the vicinity of the asperities 15a can be viewed from the bottom through a convenient aperture in deck 10. The glass of disk 17 should be hardened or tempered by any convenient means, and chemical hardening is what I prefer at the present time. The spindle is driven by a spindle motor not shown at a preselected speed similar to the normal speed of a typical disk drive spindle.

An arm support shaft 11 is also mounted for rotation on deck 10, and it carries a rigid arm 12 which extends approximately parallel to deck 10 in a cantilevered fashion over disk 17. A load spring 13 is attached to arm 12 in a cantilevered fashion as well and extends along and approximately parallel to the top surface of disk 17. At the end of load spring 13, slider 14 is attached. Slider 14, load spring 13, and arm 12 form the SGA unit to be tested, so it is important that there be a simple way to mount and dismount arm 12 from shaft 11. A stepping motor, also not shown, rotates shaft 11 so as to shift slider 14 to any of the radii of disk 17 at which asperities 15a are located.

In operation, spindle 16 rotates disk 17 at the usual speed of a recording disk in a disk drive unit, causing the slider 14 to form an air bearing lubricated by a thin film of air a few microinches on the disk 17 surface in a way entirely similar to that if it were operating in a conventional disk drive unit. By illuminating the air bearing surface (ABS) of slider 14 with monochromatic light shown through the aperture in deck 10 and through disk 17, and taking high speed photographs or video images of the Moire interference fringes formed on the ABS one can, as is well known, determine the spacing between the disk surface and the ABS. As each asperity passes under the ABS the fringe pattern will change, indicating how effectively the slider 14 can deal with the asperity. Perturbations in the flight of the slider 14 caused by passing over an asperity 15a for example can be measured by changes in the fringe pattern. If the ABS touches or comes too near the disk 17 surface, the fringe pattern will indicate this and the appropriate change in the manufacturing process or the SGA can be made to correct the situation. One would expect that some sort of sampling technique can be used to constantly monitor SGA quality. Since the test here is nondestructive and not damaging, the expensive SGA units which have been tested can be installed in production disk drive units without increased likelihood of their failure.

The fluorocarbon resin from which the asperities 15a are formed has good bonding characteristics to the glass material from which disk 17 is made. It also has a relatively low coefficient of friction and good wear resistance, so it maintains its geometry for a relatively long period of time, and does not damage the ABS if an asperity 15a should strike it. Because it is relatively soft, if particles are dislodged by such strikes, it is unlikely that the slider 14 will crash on the disk 17.

Figure 2:
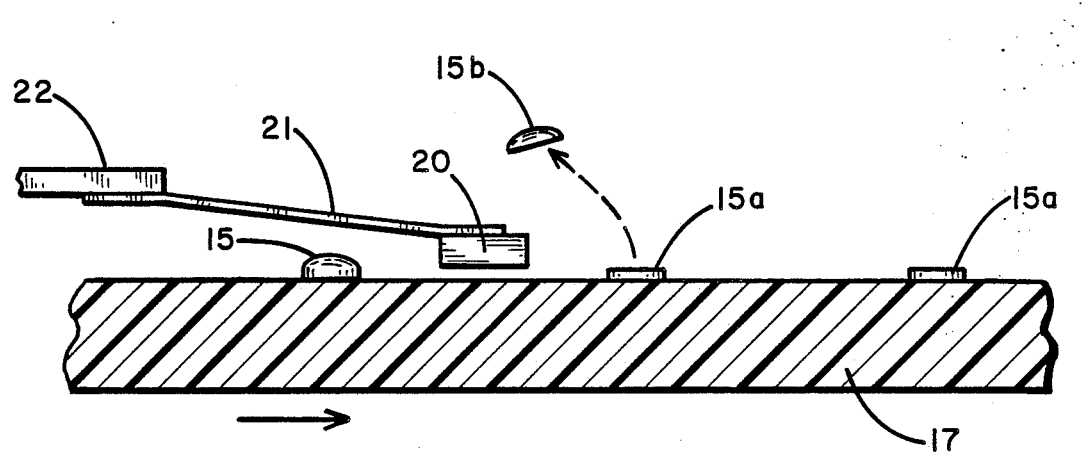
FIG. 2 is a detail of a test disk during machining of asperities to set their height to the desired value.

One problem with forming asperities on such test disks, regardless of the type, is control of the height. FIG. 2 is a detail of how this can be done on the disk of FIG. 1. Because the fluorocarbon resin is relatively soft, it can be machined to the desired height by a burnish slider without the shavings cut by the burnish slider damaging the disk 17 surface. Such a burnish slider is shown in FIG. 2 as element 20. It is supported by an arm 22 and a load spring 21 in a way entirely analogous to that shown in FIG. 1 for the operational slider 14 therein. Such a burnish slider 20 is very hard and has a number of transverse sharp edges on its ABS which act to cut the tops off projections as it encounters them. FIG. 2 shows an unmachined asperity 15 on the surface of moving disk 17 as it approaches head 20. As each asperity 15 strikes the sharp edges of head 20, a top portion 15b of the asperity 15 is detached and flies away, as is shown in a somewhat unrealistic manner in FIG. 2. It is likely that the top portion 15b will be removed in a gradual manner as many very small particles, rather than in a single large particle.

At any rate, by controlling the height at which the burnish slider 20 flies above the disk 17 surface, the height of the individual asperities 15a can be accurately controlled as well. The height at which the burnish slider 20 flies can also easily be measured by the technique explained in conjunction with FIG. 1. Once a burnish slider 20 has been fabricated that flies at the desired height, it can be used to make a number of similar disks 17 for use in production for example. It should be noted that the height to width ratio of a machined asperity 15a is shown much exaggerated in FIG. 2. In actuality, the width of an asperity 15a is about 10,000–30,000 times the height.

Figure 3:
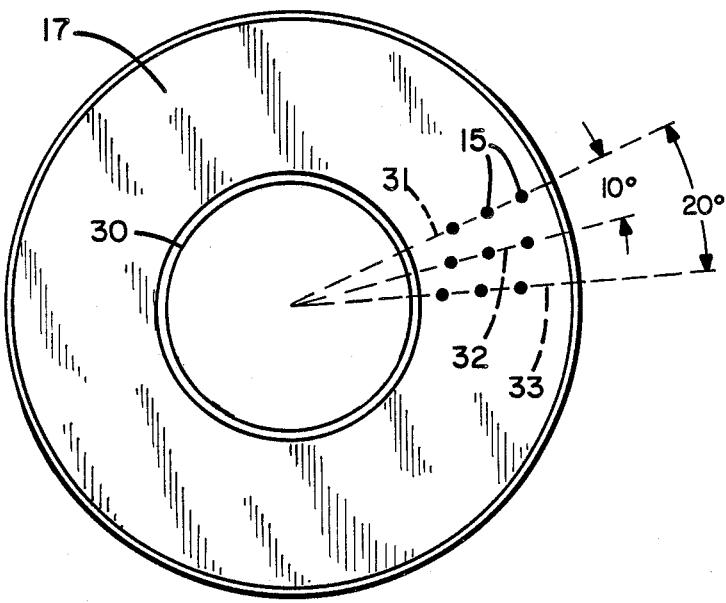
FIG. 3 is a plan view of a preferred test disk carrying the asperities on its surface.

FIG. 3 shows a preferred test disk 17 which has a outer radius of 4.527 in. (115 mm.) and a inner hole 30 whose radius is 1.969 in. (50 mm.). Nine asperities are created from the fluorocarbon-resin-with-modifiers (FRM) materials on the disk 17. Each of the asperities 15 is located at one of the intersections formed by three radii 31, 32, 33 of the disk 17 with nine concentric circles on the disk 17 surface. The two outer radii 31 and 33 are at 10° angles with the center radius 32. The nine concentric circles are spaced 0.2 in. (5.08 mm.) apart, with the largest 0.5 in. (12.7 mm.) from the edge of disk 17. Obviously for disks of other sizes, these dimensions must be varied. Each concentric circle has a single asperity 15 on it, and each radius line has three asperities on it. I have arbitrarily placed the asperities on radius line 33 at the intersections with the first, fourth, and seventh concentric circles, starting the enumeration from the inside. The asperities 15 on radius 32 are at the intersections with the second, fifth, and eighth circles, and the asperities on radius line 31 are on the third, sixth, and ninth circles. Depending on the particular application, it may be well to vary the number, size and position of the asperities.

Figure 4:
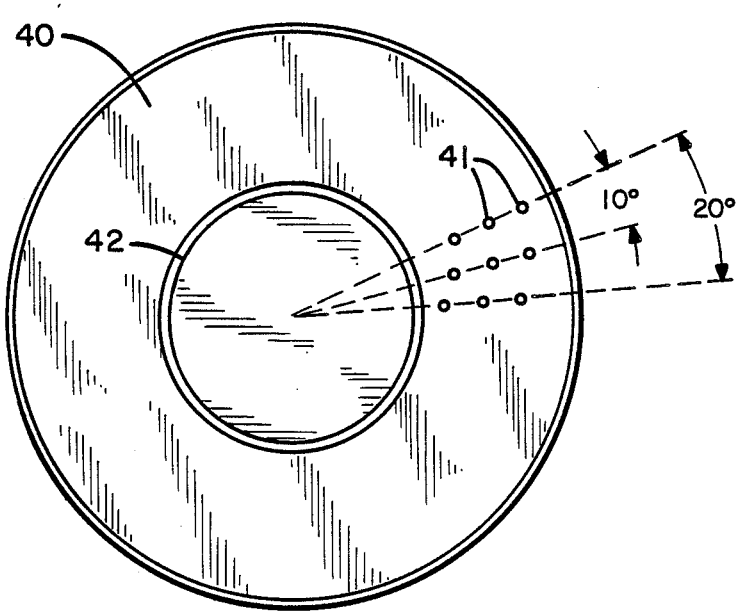
FIG. 4 is a plan view of a masking disk to be used in the fabrication process of a test disk.

I have developed an effective technique for forming the asperities which are to be machined to the proper height by the process described above. A masking disk 40 shown in FIG. 4 has nine holes 41 drilled in it to exactly correspond with the position of the asperities 15 described in connection with FIG. 3. Disk 40 is made from flat 0.075 in. (1.9 mm.) aluminum material with inner hole 42 radius and its outside radius exactly the same as for test disk 17.

In the preferred process for forming the asperities 15, the masking disk 40 is used to shield the parts of the disk 17 surface which are not intended to receive the fluorocarbon resin material. The preferred process includes the following steps, all of which should be performed in a clean room:

1. Clean both surfaces of disk 17 with acetone using a lint-free cloth.
2. Clean both surfaces of disk 17 with ammonia using a lint-free cloth.
3. Dry wipe both disk 17 surfaces with a lint-free cloth.
4. Fly a burnish slider on both surfaces of disk 17 to initially make them as smooth as possible, and select the better of the two to receive the asperities 15.
5. Carefully clean the masking disk 40.
6. Loosely overlay the surface of disk 17 which is to carry the asperities with the masking disk 40. It is necessary that the masking disk 40 be laid down in accurate initial alignment on the disk 17. Once laid down, it should not be shifted on disk 17, since this can lead to scratching of disk 17. To prevent this problem, if the test disk 17 is made of transparent glass, the masking disk 40 can be alternatively mounted beneath test disk 17, and used strictly as a positioning guide for the asperities. If placed beneath it, the masking disk 40 will not shield the operational surface of disk 17.
7. Prepare a solution of Dupont 954-201 Green Teflon-S finish having a particle size of less than 1 $\mu$in. (0.025 $\mu$) in Acetone at a concentration of 1–5 drops per 20 ml. of acetone, where 24 drops equal approximately 1 ml. This material is described in brochure E-33980, Rev. 2 of the DuPont Company, F & F Dept., Wilmington, Del. 19898. Teflon is a registered trademark of the DuPont Company.
8. Using a hypodermic syringe with a 0.007 in. (0.179 mm.) or smaller inside diameter needle, in succession make nine as small drops as possible at the needle's tip, and place the drop on disk 17 at the center of each hole 41 in masking disk 40. If the masking disk 40 is placed atop the test disk 17, the solution must not make contact with the edge of any hole 41. If any of the solution wicks into the space between the disks, the process should be restarted.
9. Dry the drops for at least one hour.
10. Place the disk assembly in a cool oven and bake at 400° F. (205° C.) for three hours, turn off the oven, and cool to room temperature.

After a disk 17 has been prepared with asperities 15 according to this process, it can be processed with a burnish slider 20 as explained in connection with FIG. 2. It can then be used in the manner explained for FIG. 1. This process cheaply and reliably produces a disk 17 having asperities with accurately controlled heights which do not damage the slider 14 under test should they touch during operation.

It is also possible to control the height of an asperity 15 by controlling the concentration of the fluorocarbon resin in the acetone solution. One drop of fluorocarbon resin in the 20 ml. of acetone will produce an asperity of around 15 to 20 $\mu$in. in the unmachined state. Five drops will produce a height proportionately higher. There is some experimentation that may be needed to control the height. However, such heights greater than around 15 μin. are not usually needed because of the preferred flying heights for a slider 14 in the range of 10–15 μin. It is also possible to create an asperity with greater heights by putting additional drops of fluorocarbon resin solution in the individual holes 41 after each previous drop has dried. It should be noted that because of the actual height to width ratio of an asperity 15 in finalized shape, it is not necessary to machine the asperity to achieve an acceptable edge for it. Accordingly, it is preferred where possible to control the height by proper choice of fluorocarbon resin-acetone concentration.

The following describes the invention and a preferred means for practicing it.

What I claim and desire to protect by Letters Patent is described by the following claims:

1. A rigid transparent glass disk for use in testing the mechanical response characteristics of a slider carrying a transducer in a magnetic disk memory unit and to replace the unit's magnetic recording disk during said testing, said disk having projections thereon formed of a fluorocarbon resin with modifiers, and having a preselected footprint shape and size and a preselected projection height above the surrounding surface; the height selected by means of burnishing the top of the projection with a burnishing slider flying at said preselected height.

2. The disk of claim 1 wherein the preselected projection height may range from approximately 4 to 12 microinches above the surrounding disk surface.

3. The disk of claim 1 wherein the preselected projection height is at least 4 microinches above the surrounding disk surface.

4. A method for forming the disk of claim 1, comprising the steps of
    (a) overlaying at least a portion of the disk's flat surface with a flat plate having a hole passing therethrough;
    (b) placing a preselected quantity of a liquid in which is dissolved a fluorocarbon resin with modifiers on the portion of the disk's flat surface surrounded by the hole;
    (c) allowing the liquid solution of fluorocarbon resin with modifiers to dry; and
    (d) baking the disk and the fluorocarbon resin with modifiers which is on it in an oven.

5. The method of claim 4, including the step of removing the flat plate from the disk, and thereafter of removing a portion of the top of the projection.

6. The method of claim 5, wherein the step of removing a portion of the top of the projection includes removing at least approximately all but the bottom 12 microinches of the projection.

7. The method of claim 5, wherein the step of removing a portion of the top of the projection includes
    (a) mounting the disk on a spindle and rotating the disk; and
    (b) flying across the projection a burnish slider having a predetermined flying height above the disk.

8. The method of claim 4, wherein the step of applying a fluorocarbon resin solution to the disk surface includes the step of applying a fluorocarbon resin solution in which particle size is not greater than 1 microinch.

* * * * *